United States Patent [19]
Graser

[11] Patent Number: 5,653,267
[45] Date of Patent: Aug. 5, 1997

[54] ARRANGEMENT FOR INSERTING AND REMOVING OF HALF-LOOM BEAMS IN A WEAVING MACHINE

[75] Inventor: Helmut Graser, Riederich, Germany

[73] Assignee: Genkinger Hege- und Foerdertechnik GmbH, Muensingen, Germany

[21] Appl. No.: 578,699

[22] PCT Filed: Jun. 16, 1994

[86] PCT No.: PCT/EP94/01957

§ 371 Date: Dec. 21, 1995

§ 102(e) Date: Dec. 21, 1995

[87] PCT Pub. No.: WO95/00688

PCT Pub. Date: Jan. 5, 1995

[30] Foreign Application Priority Data

| Jun. 25, 1993 | [DE] | Germany | 43 21 141.0 |
| Aug. 7, 1993 | [DE] | Germany | 43 26 606.1 |

[51] Int. Cl.⁶ ..................................................... D03J 1/00
[52] U.S. Cl. ............................................................... 139/1 R
[58] Field of Search ................... 384/24, 434; 242/533.3; 414/911; 28/201, 208; 139/1 R, 291 R

[56] References Cited

U.S. PATENT DOCUMENTS 4,910,837  3/1990  Fujimoto et al. ........................ 28/201
5,102,283  4/1992  Contzen ................................. 384/24

FOREIGN PATENT DOCUMENTS

| 1 535 923 | 3/1966 | Germany | 139/1 R |
| 24 17 476 | 10/1975 | Germany | 28/201 |
| 28 53 907 | 6/1980 | Germany | 139/1 R |
| 33 17 604 | 12/1984 | Germany | 139/1 R |
| 41 28 969 | 3/1993 | Germany | 139/1 R |

*Primary Examiner*—Andy Falik
*Attorney, Agent, or Firm*—Flynn, Thiel, Boutell & Tanis, P.C.

[57] ABSTRACT

An arrangement for fitting and removing half-loom beams individually or in pairs into or out of a loom beam bearing of a loom with a loom beam lifting and transport carriage (10) having at least two bearing arms (20, 24). In order to be able to lay the half-loom beams (27) in and remove them from the loom beam bearing of the loom simply and smoothly both singly and in pairs, the invention has a circumferential groove (40) in a region of the half-loom beam projecting axially over a central bearing shell with the half-loom beams (27). The beam carriage (10) being fitted with a central bearer arm (24) having spaced bearing claws which can be inserted past the bearing shell (48) into the circumferential grooves (40) from beneath as far as the bases of the grooves (38).

25 Claims, 11 Drawing Sheets

ARRANGEMENT FOR INSERTING AND REMOVING OF HALF-LOOM BEAMS IN A WEAVING MACHINE

FIELD OF THE INVENTION

The invention relates to an arrangement for inserting and removing half-loom beams into or out of a loom-beam bearing on a weaving machine, including a loom-beam lifting and transporting carriage having at least two bearing arms, wherein the half-loom beams have at their one axial end a fixed plate and a disk projecting on the outside of the fixed plate and rigidly connected to same, and the loom-beam bearing has a bearing shell to receive in pairs the disks of two half-loom beams, which disks face one another, and the bearing shell can be closed off by a, preferably swingable, bearing lid and is accessible radially laterally and/or from above through an edge opening for the half-loom beams provided on the bearing arms.

BACKGROUND OF THE INVENTION

In a conventional device of this type (DE-C-3317607), a loom-beam lifting and transporting carriage has a center bearing arm having bearing members placeable against the adjacent fixed plates of the half-loom beams, and a bearing hook gripping under the rings. The bearing hook can be fixed with respect to the bearing shell of the weaving machine receiving the disk, and is arranged movably perpendicularly with respect to the longitudinal length of the lifting and transporting carriage on the center bearing arm. The bearing hook is fixed by a nose arranged on its underside the nose being received by a recess of the extended bearing shell of the weaving machine during lowering of the bearing hook, which lowering is done by pivoting the center bearing arm. Thus the loom-beam lifting and transporting carriage is positioned during insertion, first, to the fixation position of the center bearing arm outside of the bearing shell. From there, the half-loom beams are moved, by a spindle drive on the center bearing arm with the help of the bearing members, out of the bearing hook until they fall beyond the bearing hook, edge into the bearing shell. Because of the high loom-beam mass, considerable mechanical stress is hereby applied to the loom beam and the loom-beam bearing. The removal of the half-loom beams out of the weaving machine is possible with the conventional device, possibly with the help of crowbars, with which the half-loom beams are first placed onto the bearing hooks beyond their edges. Because of the little space available in the area of the center bearing between the two half-loom beams, a removal in pairs of the half-loom beams with a continuous thread chain is, however, not possible. The warp threads must be cut off in this case and the loom beams must be removed individually, for example with the help of a dump-type carriage.

SUMMARY OF THE INVENTION

Starting out from this it is the object of the invention to develop a device of the above-identified type which makes it possible to insert and again remove half-loom beams both individually and also in pairs if necessary, with continuous warp threads, simply and smoothly into and from the loom-beam bearing of a weaving machine.

The basic thought of the solution of the invention is to grip under the half-loom beams near their disk in such a manner that they can be placed collision-free directly into the bearing shell and can be removed collision-free therefrom. In order to make this possible, the invention suggests that a bearing surface, coaxial with respect to the disk, be arranged in an area between the disk and the fixed plate of the half-loom beams, which area projects axially over the bearing shell when the half-loom beams are inserted, and that at least one of the bearing arms has a bearing claw, supported on the front side past the bearing shell from below on the front surface. As an alternative, it is suggested that the bearing arm has a bearing depression reaching into the vicinity of the bearing shell and extending around at least one of the disks partially in a circumferential direction, and at least one bearing claw is axially offset with respect to the bearing depression and can be moved or pivoted past the adjacent disk from above against the bearing surface while pressing the disk against the bearing depression.

The bearing surface is thereby advantageously defined by forming a circumferential groove laterally on its flanks with the disk on the one side and the fixed plate on the other side, wherein the base of the groove can be formed by a coaxial stepped shoulder, preferably connected in one piece to the disk.

In order to be able to remove the half-loom beams in pairs it is suggested, according to a preferred embodiment of the invention, that one of the bearing arms, preferably a center bearing arm, has two bearing claws arranged spaced with respect to each other at least at the distance of the width of the bearing shell or of the two bearing disks from one another. The bearing claws can be supported on the bearing surfaces of the two half-loom beams, and can preferably be guided into a circumferential groove provided there. Thus, the bearing claws are arranged forklike on the center bearing arm, so that during the inserting and removing operation, they can grip over a relatively flatly designed bearing bracket containing the bearing shell on its broad sides up to the bearing shell.

The two bearing claws are rigidly arranged, preferably on a common center bearing arm. However, it is advantageous in the case of the bearing claws which can be guided from above toward the bearing surfaces, when the bearing claws project over a common swivel arm hinged to the bearing arm. The bearing claws can hereby be limited pivotally relative to the bearing arm by means of a gear element arranged on the bearing arm and which is preferably designed as a crank-driven threaded rod.

It is furthermore possible that the bearing arm has two longitudinally divided, separately movable bearing-arm halves coupled with one another each of which has one of the bearing claws. The bearing-arm halves can be arranged on one common lifting shaft, wherein at least one of the two bearing-arm halves can be coupled to or uncoupled from the lifting shaft independently of the other one. However, it is also possible to provide two separately operable lifting shafts on the lifting and transporting device, each carrying one of the bearing-arm halves, and which being selectively couplable with one another. The two bearing-arm halves are rigidly coupled with the associated outer bearing arms by the lifting shaft or lifting shafts. This measure makes it possible to receive the half-loom beams individually, for example, from the floor and to insert them individually or together into the loom-beam bearing of the weaving machine. Furthermore, this permits the insertion of half-loom beams with carried warp threads in pairs.

In order to guarantee a contact-free guiding of the half-loom beams in the center bearing, it is suggested according to an advantageous embodiment of the invention that each of the lateral faces of the stationary part of the bearing shell be equipped outside of the circumferential area of the bearing claws with one guide bar which preferably vertically aligned and which engage in the circumferential groove of the inserted half-loom beams.

The width of the bearing shell is at least equal to, preferably approximately twice, the width of the individual disks. Advantageously, the claws have a concave inner curvature corresponding with the convex curvature of the bearing surface. In order to enable an adaption to different dimensions of the half-loom beams, bearing claws with different inner curvature are arranged interchangeably on the bearing arm.

An alternative embodiment of the invention provides that the disks partially project, preferably by approximately half of their wall thickness, laterally over the bearing shell and form the bearing surfaces of the bearing claws at their projecting circumferential parts. The disks can form or carry on their circumference, a stepped ring overlapping and partially guiding the side flanks of the bearing shell. One of the ring steps on its circumference the bearing surface for the bearing claw. The one of rings projects over the bearing shell and overlaps over the adjacent side flank.

In order to permit a low friction bearing of the half-loom beams on the bearing shell and on the bearing claws, the disks can be provided with a ball-bearing supported circumferential ring.

BRIEF DESCRIPTION OF THE DRAWINGS

The invention will be described in greater detail hereinafter in connection with some embodiments schematically illustrated in the drawings, in which.

DETAILED DESCRIPTION

The loom-beam lifting and transporting carriages 10 illustrated in the drawings are intended for inserting or removing in pairs (FIGS. 1 to 6, 8 to 12) or individually (FIG. 7) half-loom beams carrying, if necessary, continuous warp threads into or out of a weaving machine 12.

The respective loom-beam lifting and transporting carriages consist for this purpose of an undercarriage 14 with steerable and partially driven wheels 16, a lifting shaft 18 and outer bearing arms 20 with catchers 22, which bearing arms are longitudinally movable on said lifting shaft, and a center bearing arm 24 with bearing claws 26. The half-loom beams 27 have a loom-beam tube 30 provided with an external thread 28, a loose loom-beam plate 32 running and fixable on the thread 28 of the loom-beam tube 30, and a fixed plate 34 rigidly arranged on the opposite front end of the loom-beam tube 30. A disk 36 with a steplike shoulder 38 is coaxially arranged on the outside of the fixed plate 34, thus forming a circumferential groove 40 defined at its flanks by the fixed plate 34 and the disk 36.

The half-loom beams 27 are supported on the weaving machine 10 by means of cotter pins 42 in the outer bearings 44 and with their disks 36 in a bearing shell 48, which is open at its edge and can be closed off by means of a swingable bearing lid 46. The bearing shell 48 is positioned on a platelike machine-fixed bracket 50 supported on the floor with an elevationally adjustable support 52. A bearing slope 54 ends in the side of the bearing shell 48, which side is open at the edge.

Two approximately vertically aligned guide bars 56 are arranged on the bracket 50 on the back side of the bearing shell 48 opposite the edge opening, which guide bars grip laterally partially over the bearing shell 48 in such a manner that they engage its circumferential grooves 40, creating an axial form locking means when the half-loom beams 27 are inserted. The guide bars 56 are placed such that the bearing claws 26 of the center bearing arm 24 do not collide with said guide bars during the loom-beam exchange (compare FIG. 2).

Figure 10:
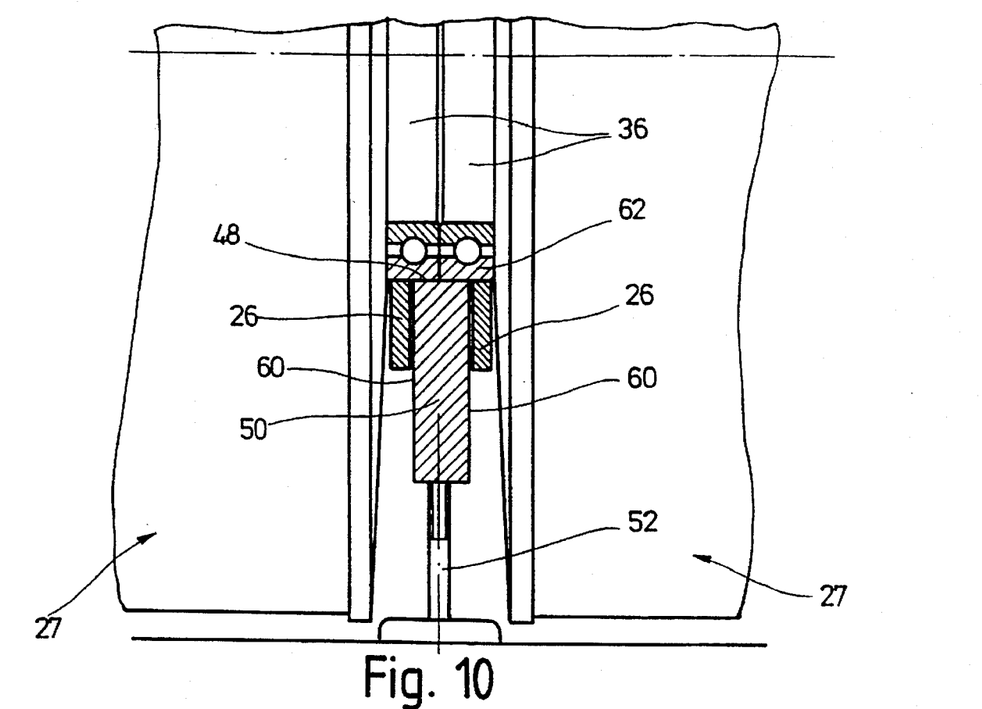
FIG. 10 is a cross-sectional view of the center bearing corresponding with FIG. 9 for a modified embodiment.
Figure 11:
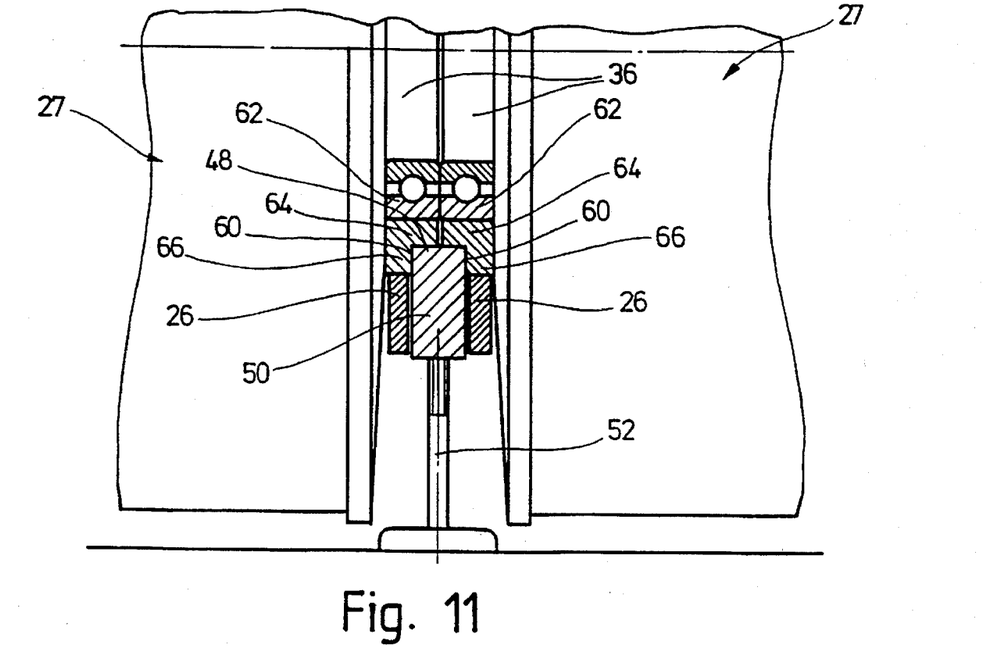
FIG. 11 is a cross-sectional view corresponding with FIGS. 9 and 10 for a further modified embodiment.

The disks 36 of the two half-loom beams 27 face one another in pairs, and are, in the embodiments according to FIGS. 10 and 11, wider in their entirety than the bearing shell 48 of the machine-fixed bracket 50 so that a space for engagement by the bearing claws 26 remains in the area between the side flanks 60 of the bearing shell 48 and the adjacent fixed plates 34. In order to enable a low friction rotation of the half-loom beams 27 in the bearing shell 48 and on the bearing claws 26, the disks 36 are in these embodiments provided with ball-bearing circumferential rings 62. The disks 36 additionally have, in the embodiment according to FIG. 11, on their circumference a stepped ring 64. The annular step 66 projects over the bearing shell 48, grips over the side flanks 60 of the bearing shell 48 forming a lateral guide, and forms on its circumference the support surface for the bearing claws 26.

Figure 8:
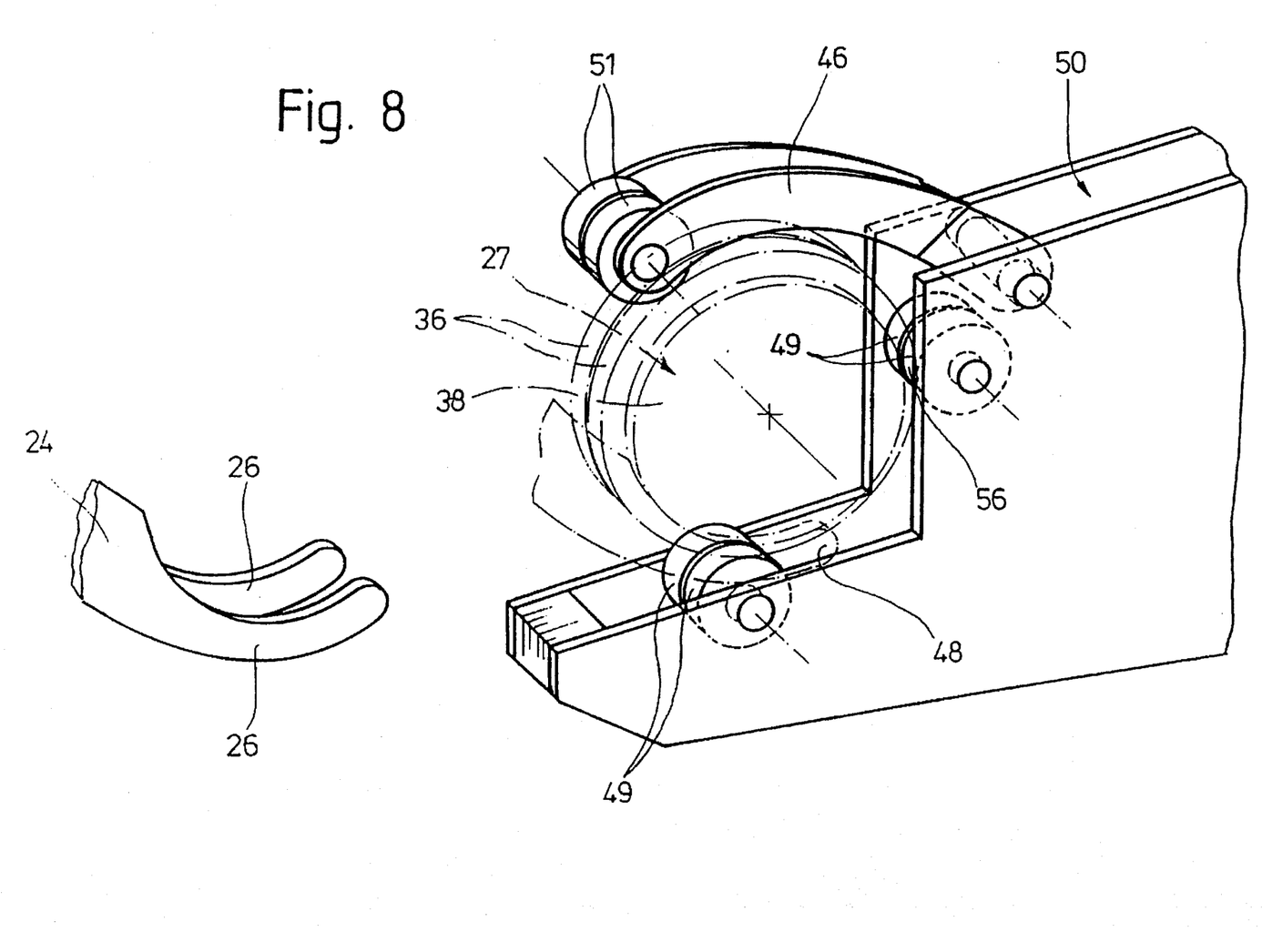
FIG. 8 is an illustrative fragment of the center bearing arm of a loom-beam lifting and transporting carriage and of a center bearing of the weaving machine provided with support rollers.
Figure 9:
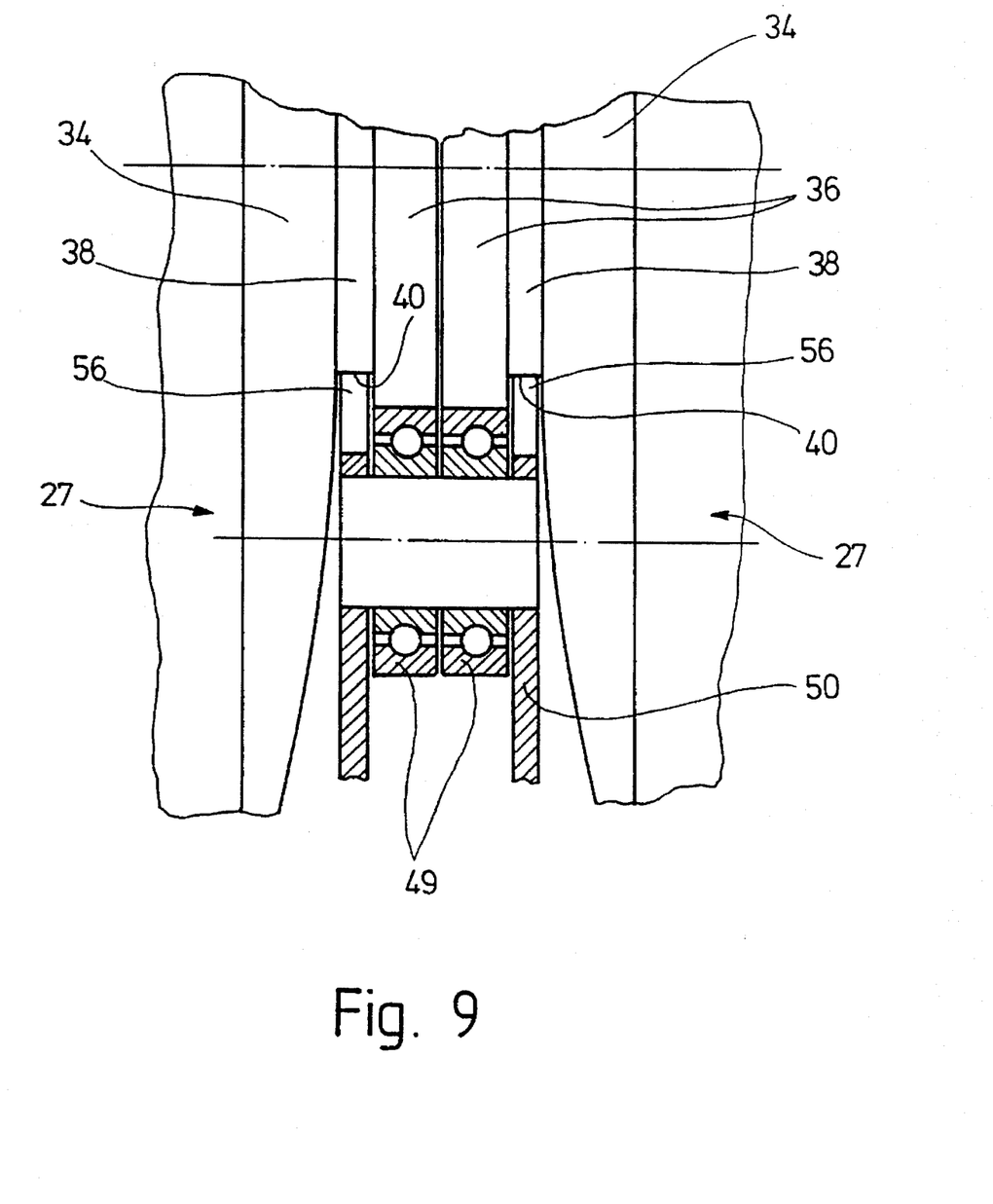
FIG. 9 is a cross-sectional view of the center bearing of FIG. 8 in the area of the lower support rollers with mounted half-loom beams.

The bracket 50 has, in the embodiment shown in FIGS. 8 and 9, two roller pairs 49 in the horizontal and vertical area of the bearing shell 48. The adjacent disks 36 of the half-loom beams 27 are supported on the pairs in such a manner that a space for engagement by the bearing claws 26 remains between the bearing-shell edge and the steplike shoulder 38. The guide bars 56 for engaging the circumferential grooves 40 are formed by the vertical flanks of the bracket 50. A closing lever hinged to the bracket 50 and swingable with a closing roller pair 51 against the circumference of the disks 36 is provided as the bearing lid 46.

Figure 1:
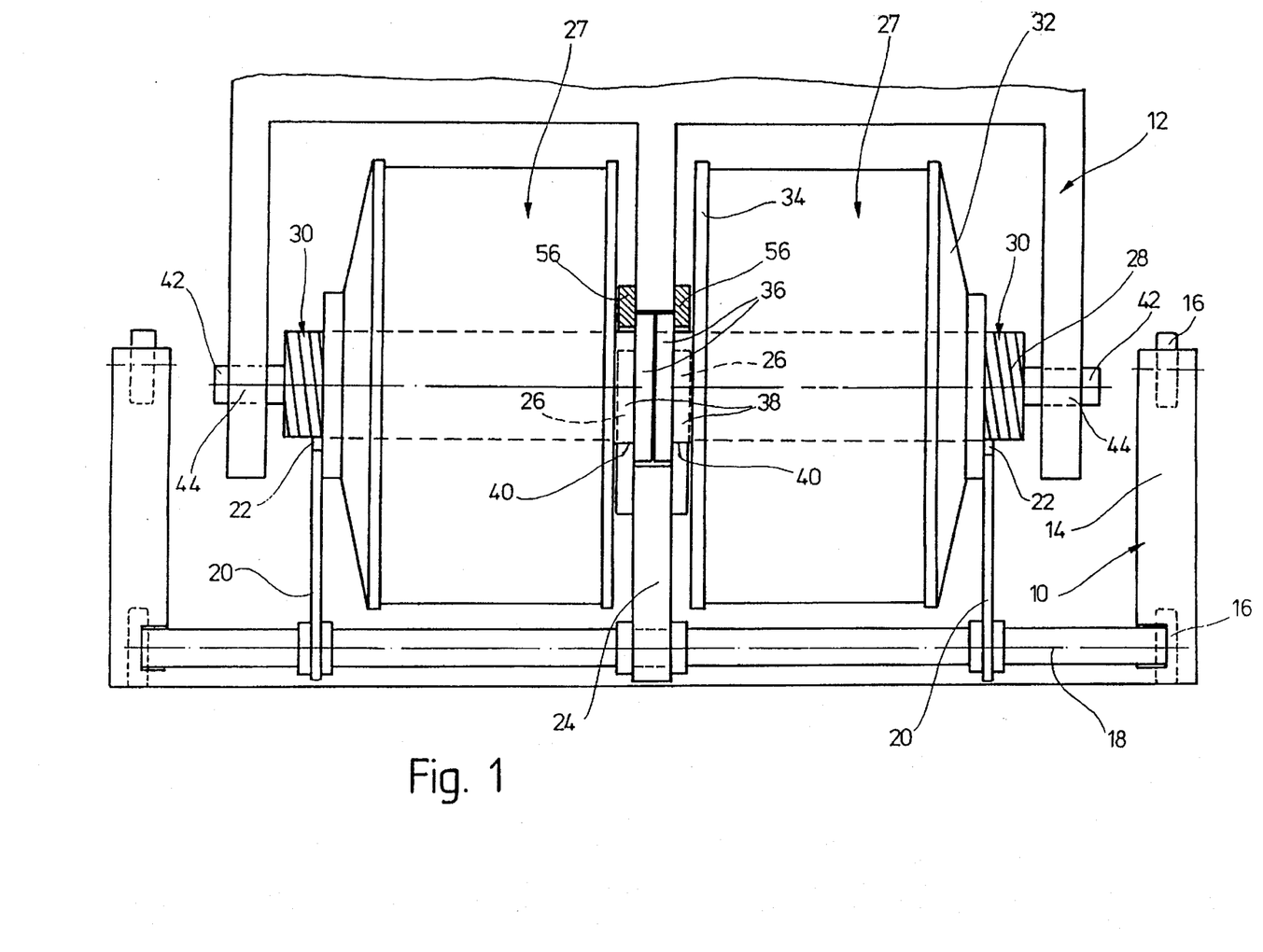
FIG. 1 is a top view of a half-loom beam lifting and transporting carriage in an insertion position.
Figure 2:
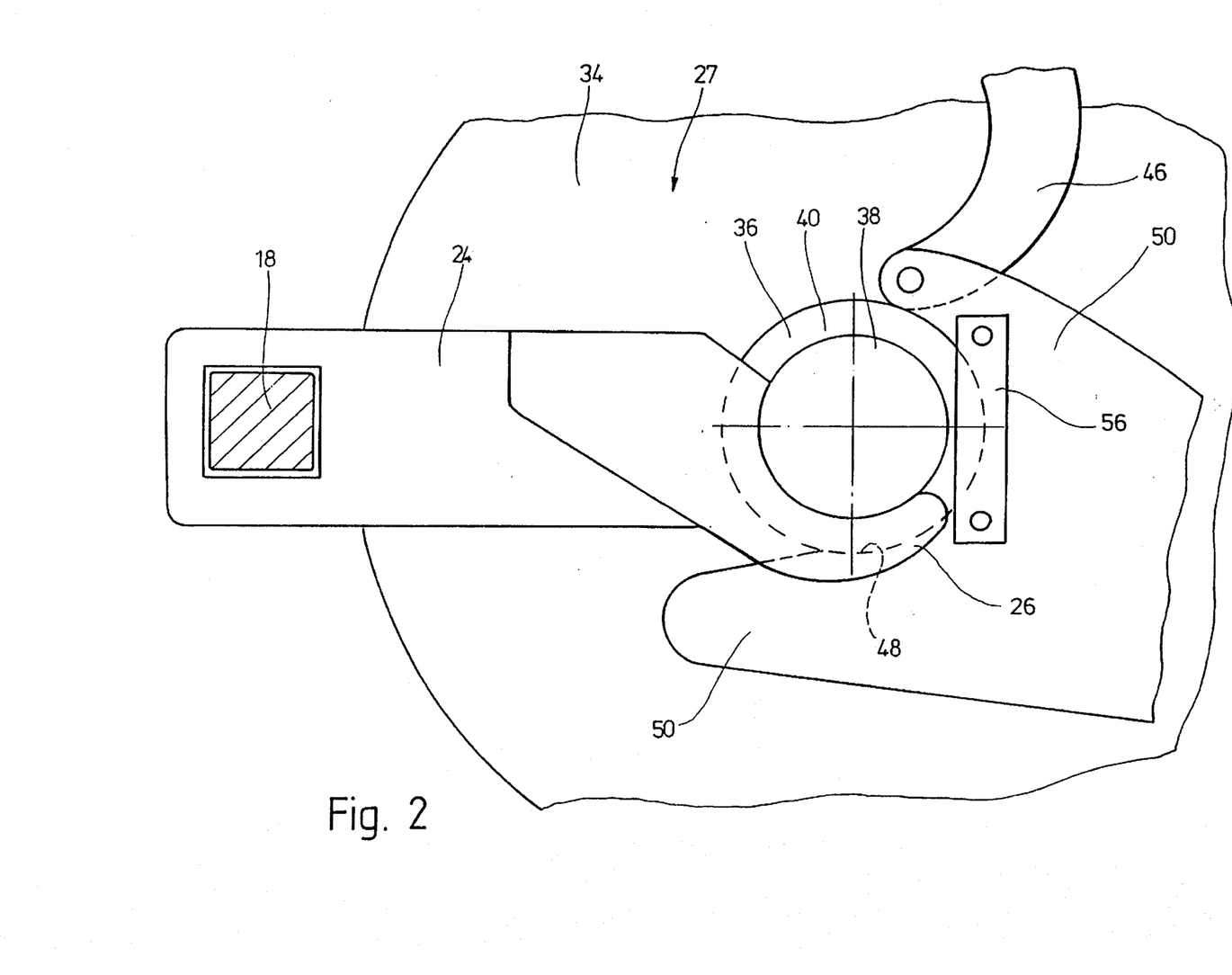
FIG. 2 is an enlarged side view fragment of the center bearing arm of the loom-beam lifting and transporting carriage in an inserted position.
Figure 3:
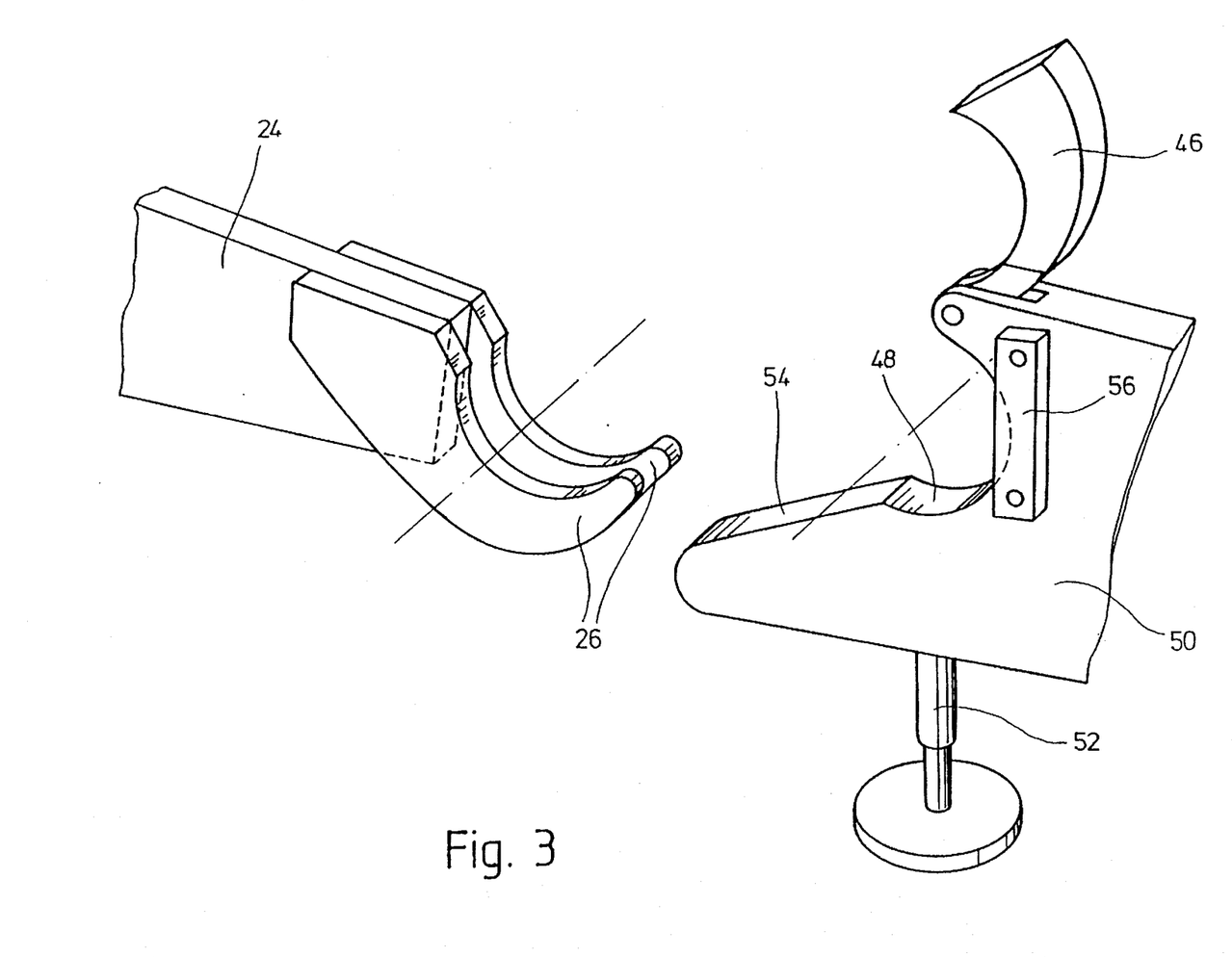
FIG. 3 is an illustrative fragment of the center bearing arm of the loom-beam lifting and transporting carriage and of the center bearing of the weaving machine.

The bearing claws 26 are, in the embodiment illustrated in FIGS. 1 to 3, rigidly arranged on a common one-piece center bearing arm 24 which is arranged together with the outer bearing arms 20 on a common square lifting shaft 18. This arrangement is particularly suited for inserting and removing the half-loom beams 27 in pairs. The half-loom beams 27 are for this purpose gripped together on the side of their respective disks 36 by the bearing claws 26 of the center bearing arm 24. The bearing claws 26 engage, with their concavely curved part, the circumferential grooves 40 from below and contact the groove base 38. Therein the disks 36 are positioned in the open space between the two bearing claws 26. In addition, the catchers 22 on the bearing arms 20 grip under the half-loom beams 27 on the parts of the loom-beam tubes 30 which project beyond the loom-beam plates 32.

To insert the half-loom beams 27 into the weaving machine, the loom-beam lifting and transporting carriage 10 is placed in the warp course and positioned to the front of the weaving machine until the bearing arms 20, 24 with their catchers 22 and bearing claws 26, together with the half-loom beams 27 provided thereon, are in a bearing position. The two spaced-apart bearing claws 26 grip in this position laterally over the bearing bracket 50 in the area of the bearing shell 48, as this can be seen in FIG. 2 for example. It is possible in this manner to place the disks 36 of the half-loom beams 27 directly in the bearing shell without a collision occurring between the bearing claws 26 and the bracket 50. An automatic tolerance compensation during the inserting operation can occur to a certain degree through suitable slopes on the area of the bearing claws 26 and/or on the bracket 50. After the half-loom beams 27 are also secured in the area of the outer bearings 44 with the help of the cotter pins 42, the bearing arms 20, 24 can be lowered by the lifting shaft 18, and the loom-beam lifting carriage 10 can be moved out of its loading position.

The half-loom beams are removed in reversed sequence by first moving the loom-beam lifting carriage 10 with lowered bearing arms 20, 24 into the removing position, by then lifting the bearing arms 20, 24 with their catchers 22 and their bearing claws 26 to rest against the projecting tube parts 30 and the groove base 38, by removing the cotter pins 42 and by moving the loom-beam lifting carriage 10 together with the half-loom beams 27 lifted out of the bearing points 48, 44 from the bearing area of the weaving machine.

Figure 4:
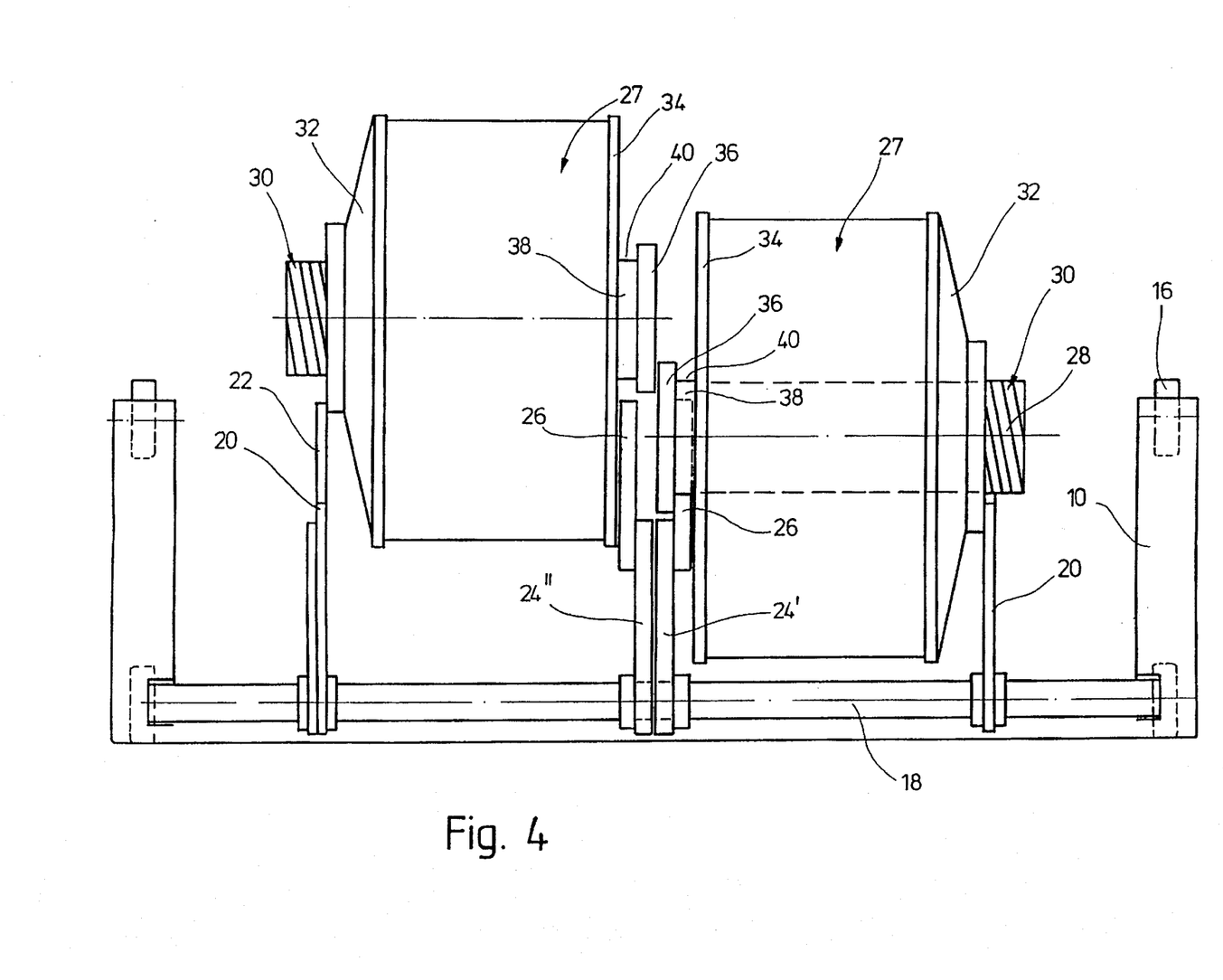
FIG. 4 is a top view of a loom-beam lifting and transporting carriage with a divided center bearing arm during the individual receiving of half-loom beams.
Figure 5:
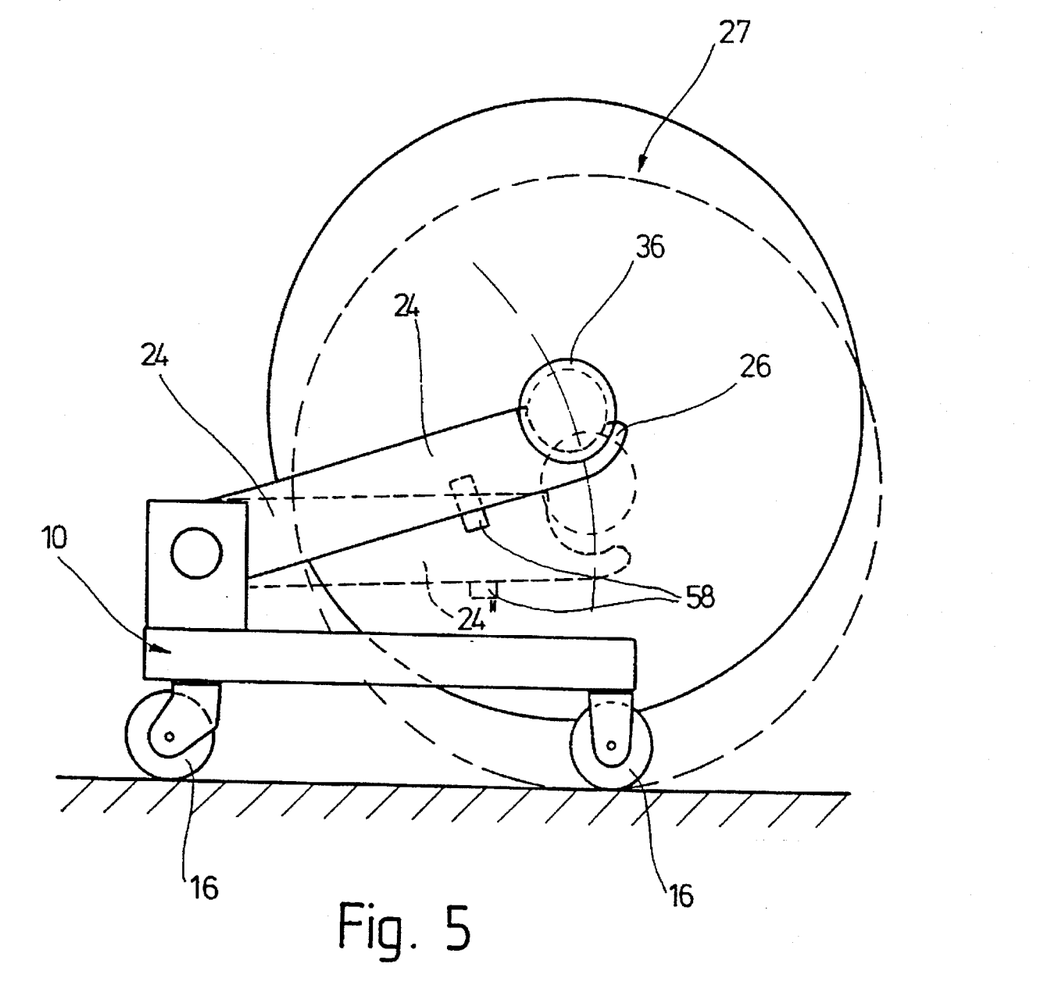
FIG. 5 is a side view of the loom-beam lifting and transporting carriage according to FIG. 4 with the center bearing arm divided in two.
Figure 6:
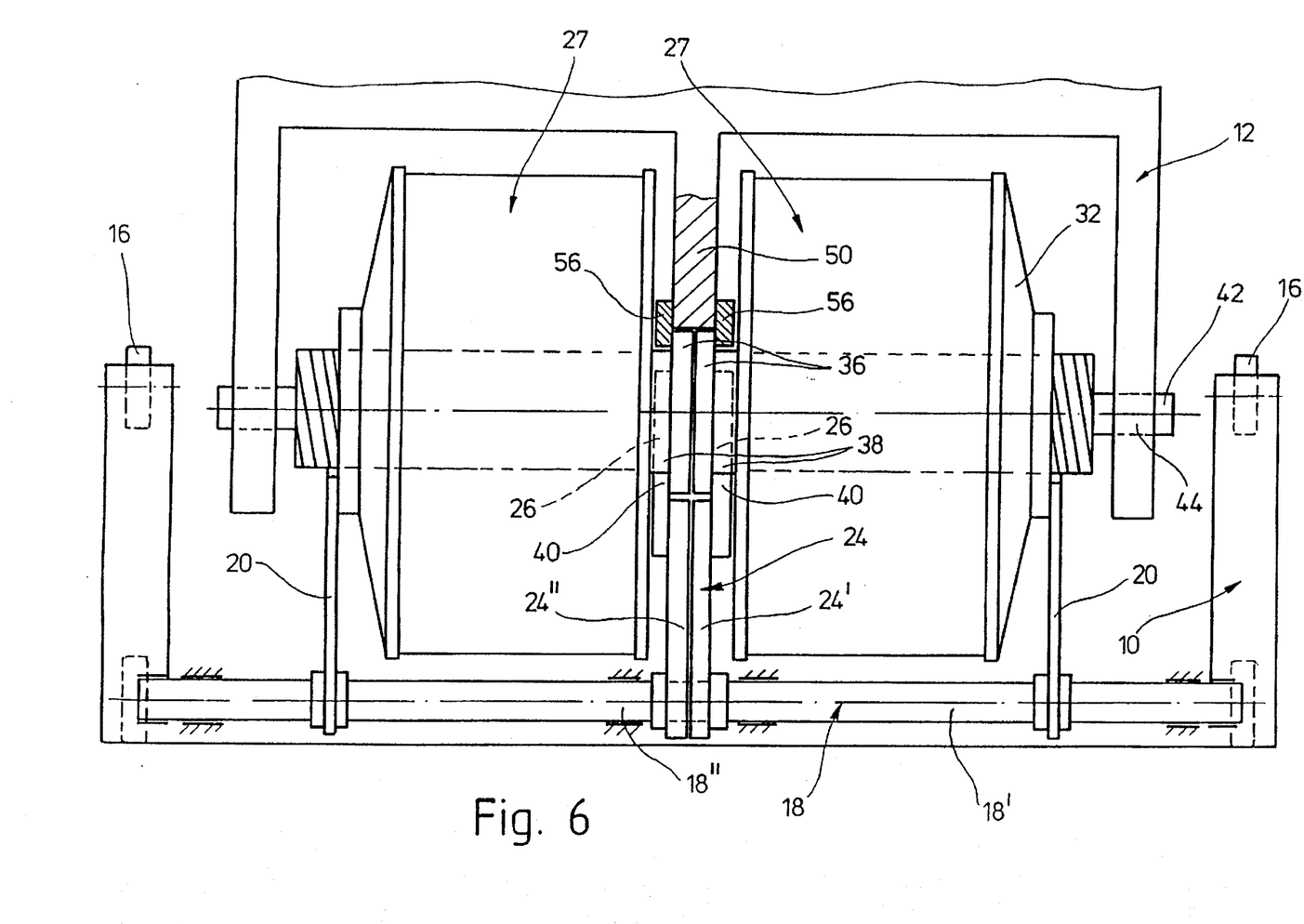
FIG. 6 is a top view of a half-loom beam lifting and transporting carriage with the center bearing arm divided in two and with a divided lifting shaft.

The center bearing arm 24 is, in the embodiments illustrated in FIGS. 4 to 6, longitudinally divided into two bearing-arm halves 24', 24", each carrying one of the two bearing claws 26', 26". The bearing-arm halves 24', 24" can each be operated together with the adjacent outer bearing arm 20 so that the half-loom beams 27 can be received individually by the base or by a frame (compare FIGS. 4 and 5). The bearing-arm halves 24', 24" can on the other hand be coupled with one another by suitable coupling members 58 so that an inserting and removing of the half-loom beams 27 in pairs into the weaving machine or out of this weaving machine is possible. The bearing-arm halves 24', 24" can be operated separately either in such a manner that the bearing-arm halves and the associated outer bearing arms 20 can be coupled separately from one another with the common lifting shaft 18 or can be uncoupled therefrom (FIGS. 4 and 5). On the other hand, it is possible to arrange the bearing-arm halves 24', 24" on separate lifting-shaft parts 18', 18" (FIG. 6), which can be selectively coupled with one another and of which one or both can be driven.

Figure 7:
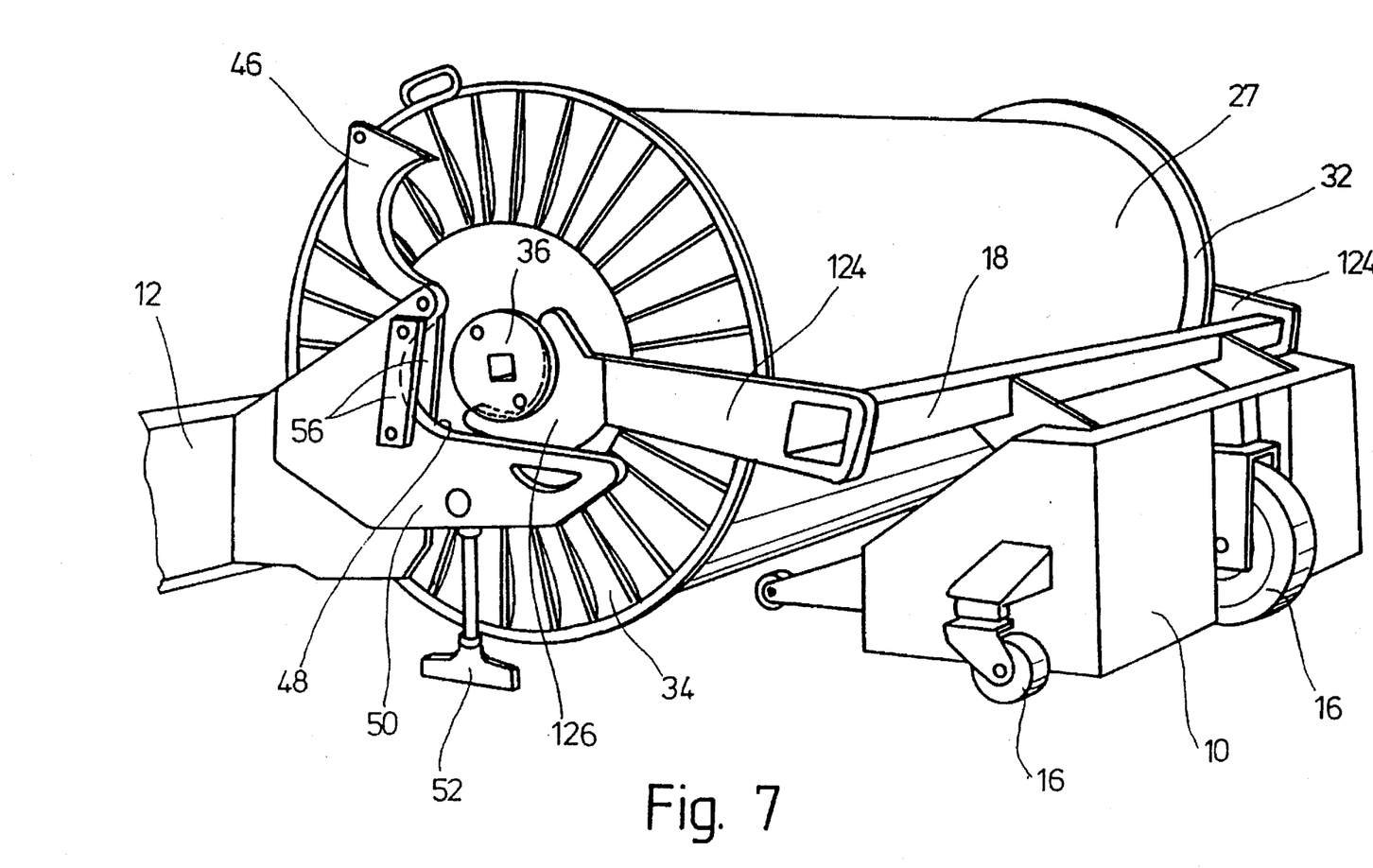
FIG. 7 is an illustration of a loom-beam lifting and transporting carriage for individual half-loom beams in an inserted position.

The loom-beam lifting and transporting carriage 10 has, in the embodiment illustrated in FIG. 7, only two lateral bearing arms 124 designated to receive a half-loom beam 27. The bearing arms 124 have a bearing claw 126, which is designed to be so narrow that it can be introduced from below into the circumferential groove of one or the other half-loom beam 27. With this it is assured that a single loom-beam lifting carriage can be utilized for the left and also for the right half-loom beam 27.

Figure 12A:
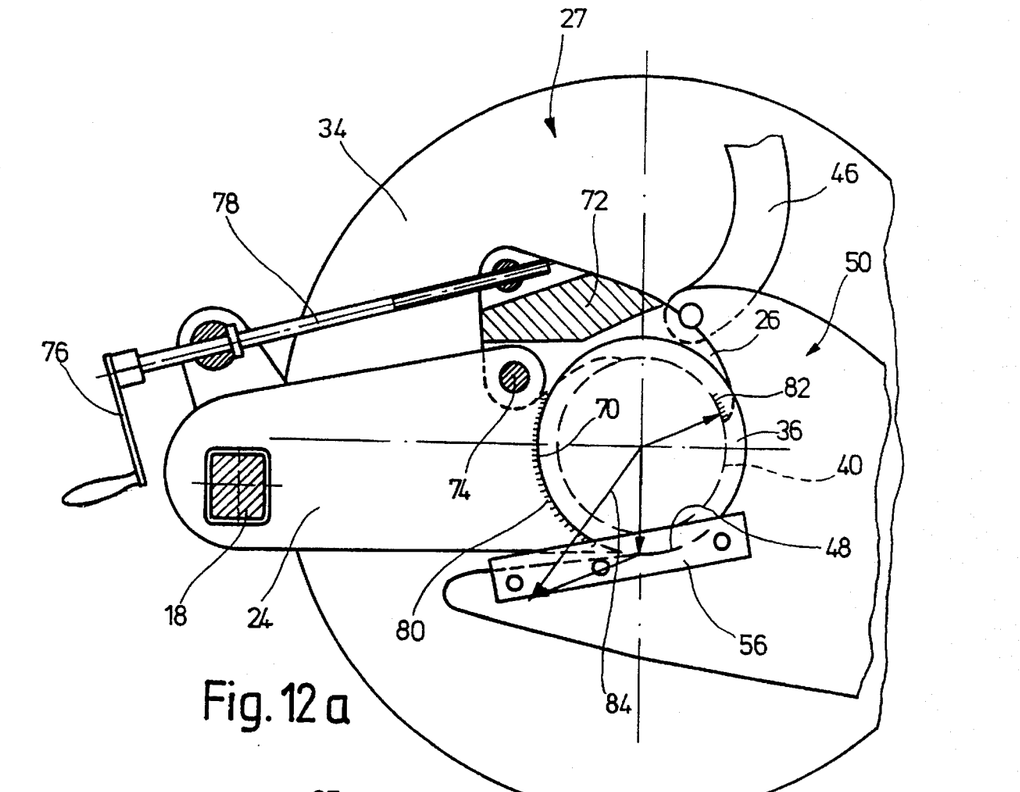
FIGS. 12a and b are a side view fragment and a top view fragment of a modified embodiment of a center bearing arm of the loom-beam lifting and transporting carriage in an inserted position.
Figure 12B:
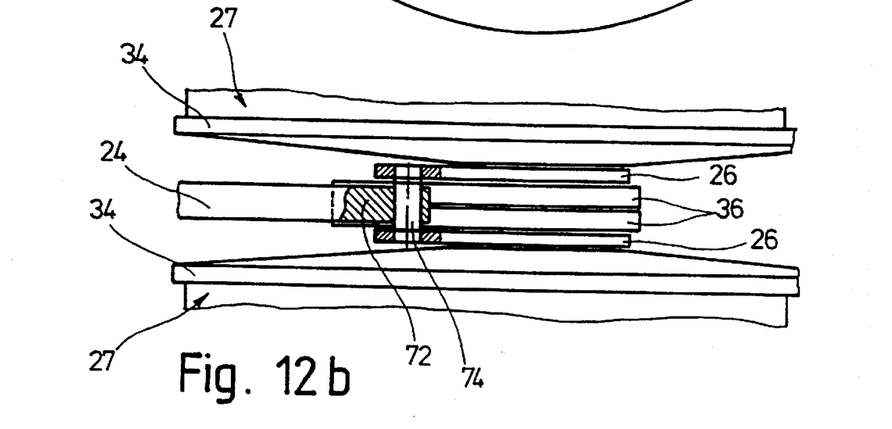

The center bearing arm 24 of the loom-beam lifting and transporting carriage has, in the embodiment according to FIGS. 12a and b, a front-side depression 70 with a curvature adapted to the circumferential curvature of the disks 36, which depression partly grips around the disks in the inserting and removing position. A swivel arm 72 is furthermore hinged to a joint 74 in the upper front-side area of the center bearing arm 24 and can be pivoted about the axis 74 by means of a threaded rod 78 rotatable by a crank 76. Two bearing claws 26 arranged at a lateral distance from one another project on the front side over the swivel arm 72, the claws during pivoting of the swivel arm 72 engage the circumferential groove 40 between the adjacent disks 36 and the fixed plates 34. In this manner they produce a holding force 84 on the oppositely lying holding surfaces 80, 82 enabling an inserting and removing of the half-loom beams in pairs into and out of the weaving-machine bearing 48. The guide bar 56 which in the inserted state also engages the circumferential groove 40, does not represent an obstacle for the center bearing arm 24.

In summary the following is to be stated: The invention relates to an arrangement for inserting and removing half-loom beams into or out of a loom-beam bearing of a weaving machine including a loom-beam lifting and transporting carriage 10 having at least two bearing arms 20, 24. In order to be able to simply and smoothly insert and remove both individually and also in pairs the half-loom beams 27 into and out of the loom-beam bearing of the weaving machine, it is suggested according to the invention that a circumferential groove 40 be arranged in an area of the half-loom beams projecting axially over a center bearing shell when the half-loom beams 27 are inserted, and that the loom-beam lifting carriage 10 has a center bearing arm 24 having two spaced-apart bearing claws 26, which can be guided past the bearing shell 48 from below into the circumferential grooves 40 up to the base of the groove 38.

I claim:

1. In combination with half-loom beams supported by a loom beam bearing, an arrangement for inserting and removing of half-loom beams individually or in pairs into or from said loom-beam bearing of a weaving machine, comprising: a loom beam lifting and transporting carriage having at least two bearing arms, wherein said half-loom beams have at one end a fixed plate and a disk which is axially spaced from an outer facing side of said fixed plate and which is rigidly connected to said fixed plate, said loom-beam bearing having a first bearing surface and receiving therein a pair of said disks of two adjacent said half-loom beams, wherein each of said pair of said disks of the two of said half-loom beams has end surfaces which face and oppose one another, access to said first bearing surface being closed off in a first position of a pivotable bearing lid and being accessible radially laterally and/or from above through an edge opening for said half-loom beams when said half-loom beams are positioned on the bearing arms and when said lid is in a second position, wherein a second bearing surface is provided on and is coaxial with respect to each said disk and is arranged in an area between each said disk and said fixed plate on said half-loom beams, said second surface area extending axially to said first bearing surface when said half-loom beams are inserted in said loom beam bearing, and wherein at least one of said bearing arms has at least one bearing claw which is positioned on a distal end thereof, said at least one bearing claw extending coextensively with said first bearing surface and effecting a support from below of said second bearing surface.

2. The combination according to claim 1, wherein one of said bearing arms has two bearing claws spaced from one another at a distance corresponding to a width of said first bearing surface and said pair of said disks, said bearing claws each having surface means thereon adapted to support said second bearing surfaces of said two half-loom beams and to be each received into a circumferential groove provided between each said disk and said fixed plate.

3. The combination according to claim 1, wherein said at least one bearing claw is rigidly arranged on a bearing arm common to both half-loom beams.

4. The combination according to claim 3, wherein said bearing arm common to both half-loom beams has two longitudinally divided, separately movable bearing-arm halves which are adapted to be coupled to each other, each having thereon one of said bearing claws.

5. The combination according to claim 4, wherein said bearing-arm halves are arranged on a common lifting shaft, at least one of said bearing-arms halves being adapted to be coupled to and uncoupled from said lifting shaft.

6. The combination according to claim 4, further comprising two separately operable lifting shafts, each of which carries one of said bearing-arm halves thereon.

7. The combination according to claim 1, wherein said second bearing surface is delimited laterally by said disk and said fixed plate and forming a circumferential groove therebetween, and wherein said at least one bearing claw is adapted to be inserted into said circumferential groove up to a base of said groove.

8. The combination according to claim 7, wherein said first bearing surface is formed on a machine bracket, wherein lateral faces of said machine bracket are each fitted with a guide bar which is received in a corresponding one of said circumferential grooves of said half-loom beams when said half-loom beams are inserted into said arrangement.

9. The combination according to claim 8, wherein said the guide bars extend vertically on said machine bracket.

10. The combination according to claim 1, wherein said second bearing surface is formed by a circumference of a stepped shoulder which is coaxial to said disk and is connected to said disk to form a single part.

11. The combination according to claim 1, wherein said at least one bearing claw has a concave inner curvature corresponding to a convex curvature of said second bearing surface.

12. The combination according to claim 11, wherein a plurality of bearing claws each having different inner curvatures are arranged interchangeably on said bearing arm that is common to both of said half-loom beams.

13. The combination according to claim 10, wherein said disks and said stepped shoulders form a stepped ring which partially overlaps said first bearing surface along side flanks thereof.

14. The combination according to claim 1, wherein said disks carry a ball-bearing supported circumferential ring.

15. In combination with half-loom beams supported by a loom beam bearing, an arrangement for inserting and removing of half-loom beams individually or in pairs into or from said loom-beam bearing of a weaving machine, comprising: a loom beam lifting and transporting carriage having at least two bearing arms, wherein said half-loom beams have at one end a fixed plate and a disk which is axially spaced from an outer facing side of said fixed plate and which is rigidly connected to said fixed plate, said loom-beam bearing having a first bearing surface receiving therein a pair of said disks of two adjacent said half-loom beams, wherein each of said pair of disks has end surfaces which face and oppose one another, and access to said first bearing surface being closed off in a first position of a pivotable bearing lid and being accessible radially laterally and/or from above through an edge opening for said half-loom beams when said half loom beams are positioned on the bearing arms and when said lid is in a second position, wherein a second bearing surface is provided on and is coaxial with respect to each said disk and is arranged in an area between each said disk and said fixed plate on said half-loom beams, said area extending coaxially to said first bearing surface when said half-loom beams are inserted in said loom beam bearing, and wherein one of said bearing arms has a third bearing surface, which partially encompasses an outer surface at least one of said disks in a circumferential direction, and at least one bearing claw which is axially offset with respect to said third bearing surface and which is adapted to be pivoted to a position along side of said adjacent disk and into engagement with said second bearing surface to press said disk against said third bearing surface.

16. The combination according to claim 15, wherein said at least one bearing claw projects from a distal side of a common swivel arm which is pivotally connected to said bearing arm.

17. The combination according to claim 16, wherein said at least one bearing claw is adapted to be pivoted on said bearing arm by means of an actuator arranged on said bearing arm, said actuator being a crank-driven threaded rod.

18. The combination according to claim 15, wherein said second bearing surface is delimited laterally by said disk and said fixed plate and forming a circumferential groove therebetween, and wherein said at least one bearing claw is adapted to be inserted into said circumferential groove up to a base of said groove.

19. The combination according to claim 18, wherein said first bearing surface is formed on a machine bracket, wherein lateral faces of said machine bracket are each fitted with a guide bar which is received in a corresponding one of said circumferential grooves of said half-loom beams when said half-loom beams are inserted into said combination.

20. The combination according to claim 19, wherein said guide bars extend vertically on said machine bracket.

21. The combination according to claim 15, wherein said second bearing surface is formed by a circumference of a stepped shoulder which is coaxial to said disk and is connected to said disk to form a single part.

22. The combination according to claim 21, wherein said disks and said stepped shoulders form a stepped ring which partially overlaps said second first bearing surface along side flanks thereof.

23. The combination according to claim 15, wherein said bearing claw has a concave inner curvature corresponding to a convex curvature of said second bearing surface.

24. The combination according to claim 22, wherein a plurality of said bearing claws each having different inner curvatures are arranged interchangeably on said bearing arm that is common to both of said half-loom beams.

25. The combination according to claim 2, wherein said disks carry a ball-bearing supported circumferential ring.

* * * * *

UNITED STATES PATENT AND TRADEMARK OFFICE
CERTIFICATE OF CORRECTION

PATENT NO. : 5,653,267
DATED : August 5, 1997
INVENTOR(S) : Helmut GRASER

It is certified that error appears in the above-indentified patent and that said Letters Patent is hereby corrected as shown below:

On the title page, item [73] change the name of Assignee;

"Genkinger Hege- und Foerdertechnik GmbH"

to ---Genkinger Hebe- und Foerdertechnik GmbH---.

Column 7, line 25; replace "bearing-arms" with

---bearing-arm---.

Column 8, line 55; delete "second".

line 64; replace "2" with ---15---.

Signed and Sealed this

Third Day of March, 1998

*Attest:*

BRUCE LEHMAN

*Attesting Officer*  *Commissioner of Patents and Trademarks*